United States Patent
MacPherson

(10) Patent No.: US 11,660,913 B2
(45) Date of Patent: May 30, 2023

(54) SYSTEMS AND METHODS FOR TIRE VALUATION

(71) Applicant: Centred Technology LLC, Gothenburg, NE (US)

(72) Inventor: Eric MacPherson, Gothenburg, NE (US)

(73) Assignee: Centred Technology LLC, Gothenburg, NE (US)

( * ) Notice: Subject to any disclaimer, the term of this patent is extended or adjusted under 35 U.S.C. 154(b) by 172 days.

(21) Appl. No.: 16/943,315

(22) Filed: Jul. 30, 2020

(65) Prior Publication Data

US 2021/0031569 A1     Feb. 4, 2021

Related U.S. Application Data

(60) Provisional application No. 62/881,310, filed on Jul. 31, 2019.

(51) Int. Cl.
*B60C 11/24*     (2006.01)
*G01M 17/02*     (2006.01)

(52) U.S. Cl.
CPC ......... *B60C 11/246* (2013.01); *G01M 17/027* (2013.01)

(58) Field of Classification Search
CPC .. G01M 17/027; G01M 17/02; G01M 17/025; B60C 11/246; G06T 7/00; G06T 7/0004; G06T 7/0006; G06Q 30/0601; G06Q 30/0633
See application file for complete search history.

(56) References Cited

U.S. PATENT DOCUMENTS

2013/0159201 A1*   6/2013   Kirian ................... G06Q 50/04
                                                                705/305
2021/0197625 A1*   7/2021   Laperle ............... G01M 17/027

FOREIGN PATENT DOCUMENTS

| CN | 105366464 | * | 3/2016 |
| KR | 20160064161 | * | 6/2016 |
| WO | WO 2020/041899 | * | 3/2020 |

OTHER PUBLICATIONS

LanOTR. "Calculator." Aug. 29, 2016, lanotr.com/calculator/, accessed Mar. 15, 2022.*
"Measuring tire tread depth using a projected laser", IP.com, 2018.*
"Treadsure." https://treadsure.app, accessed Mar. 14, 2022.—An application that performs the claimed invention.*

* cited by examiner

*Primary Examiner* — Catherine T. Rastovski
(74) *Attorney, Agent, or Firm* — Dickinson Wright PLLC

(57) ABSTRACT

A method includes receiving a first input that indicates an aspect of a tire and capturing a first image of the tire. The method also includes communicating, to a remotely located server, the first image of the tire and receiving, from the server, at least one of a brand of the tire, a model of the tire, and a size of the tire. The method also includes capturing a baseline measurement of a tread depth of the tire and calculating an actual tread depth of the tire. The method also includes calculating, using information stored in a database and based on the actual tread depth of the tire and the at least one of the brand of the tire, the model of the tire, and the size of the tire, a value of the tire.

20 Claims, 4 Drawing Sheets

SYSTEMS AND METHODS FOR TIRE VALUATION

CROSS-REFERENCES TO RELATED APPLICATIONS

This patent application claims priority to U.S. Provisional Patent Application Ser. No. 62/881,310, filed Jul. 31, 2019, which is incorporated herein by reference in its entirety.

TECHNICAL FIELD

This disclosure relates to tire valuation, and in particular to systems and methods for improving tire valuation.

BACKGROUND

Tires, such as those found on cars, trucks, sport utility vehicles, crossovers, mini-vans, marine crafts, aircrafts, all-terrain vehicles, recreational vehicles, agricultural vehicles and equipment, and the like, are typically provided in a variety of sizes having a variety of tread types (e.g., shapes and sizes) and tread depths. Over a period, tread of a tire is worn from use, environmental factors, and/or other suitable factors. Typically, when the tire tread is worn beyond a point of usefulness (e.g., or safety), the tire is replaced.

However, in certain scenarios, especially for tires related to agricultural vehicles and equipment (e.g., collectively referred to as agricultural machines), tires may be removed from one agricultural machine and installed on another agricultural machine. Typically, this involved the owner of one agricultural machine selling one or more tires and the owner of another agricultural machine purchasing the one or more tires. Accordingly, a market has developed around the purchasing and selling of previously used tires. To properly value a used tire, various factors, such as the tire brand, the tire model, the tire size, the tire tread depth, tire condition (e.g., weather cracking, stubble damage, and the like) and other factors, are considered.

SUMMARY

This disclosure relates generally to tire valuation systems and methods.

According to an aspect of the disclosed embodiments includes a tire valuation system. The system includes a processor and a memory. The memory includes instructions that, when executed by the processor, cause the processor to: receive a first input that indicates at least one aspect of a tire; capture, using an image capturing device, a first image of the tire; communicate, to a remotely located server, the first image of the tire, wherein the server is configured to analyze the first image and identify, at least one of a brand of the tire, a model of the tire, and a size of the tire; receive, from the server, the at least one of the brand of the tire, the model of the tire, and the size of the tire; provide, at an interface, a first output indicating the at least one of the brand of the tire, the model of the tire, and the size of the tire; capture, using the image capturing device and at least one sensor, a baseline measurement of a tread depth of the tire; calculate, using the captured baseline measurement of the tread depth of the tire, an actual tread depth of the tire; provide, at the interface, a second output indicating at least the actual tread depth of the tire; and calculate, using information stored in a database and based on the actual tread depth of the tire and the at least one of the brand of the tire, the model of the tire, tire condition (e.g., weather cracking, stubble damage, and the like), and the size of the tire, a value of the tire.

Another aspect of the disclosed embodiments includes a tire valuation method. The method includes receiving a first input that indicates at least one aspect of a tire and capturing, using an image-capturing device, a first image of the tire. The method also includes communicating, to a remotely located server, the first image of the tire, wherein the server is configured to analyze the first image and identify, at least one of a brand of the tire, a model of the tire, and a size of the tire. The method also includes receiving, from the server, the at least one of the brand of the tire, the model of the tire, and the size of the tire and providing, at an interface, a first output indicating the at least one of the brand of the tire, the model of the tire, and the size of the tire. The method also includes capturing, using the image capturing device and at least one sensor, a baseline measurement of a tread depth of the tire and calculating, using the captured baseline measurement of the tread depth of the tire, an actual tread depth of the tire. The method also includes providing, at the interface, a second output indicating at least the actual tread depth of the tire and calculating, using information stored in a database and based on the actual tread depth of the tire and the at least one of the brand of the tire, the model of the tire, and the size of the tire, a value of the tire.

Another aspect of the disclosed embodiments includes an apparatus for tire valuation. The apparatus includes a processor and a memory. The memory includes instructions that, when executed by the processor, cause the processor to: capture, using an image capturing device, a first image of the tire; communicate, to a remotely located server, the first image of the tire, wherein the server is configured to analyze the first image and identify, at least one of a brand of the tire, a model of the tire, and a size of the tire; receive, from the server, the at least one of the brand of the tire, the model of the tire, and the size of the tire; capture, using the image capturing device and at least one sensor, a baseline measurement of a tread depth of the tire; calculate, using the captured baseline measurement of the tread depth of the tire, an actual tread depth of the tire; calculate, using information stored in a database and based on the actual tread depth of the tire and the at least one of the brand of the tire, the model of the tire, tire condition (e.g., weather cracking, stubble damage, and the like), s and the size of the tire, a value of the tire; and provide a summary of the value of the tire.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
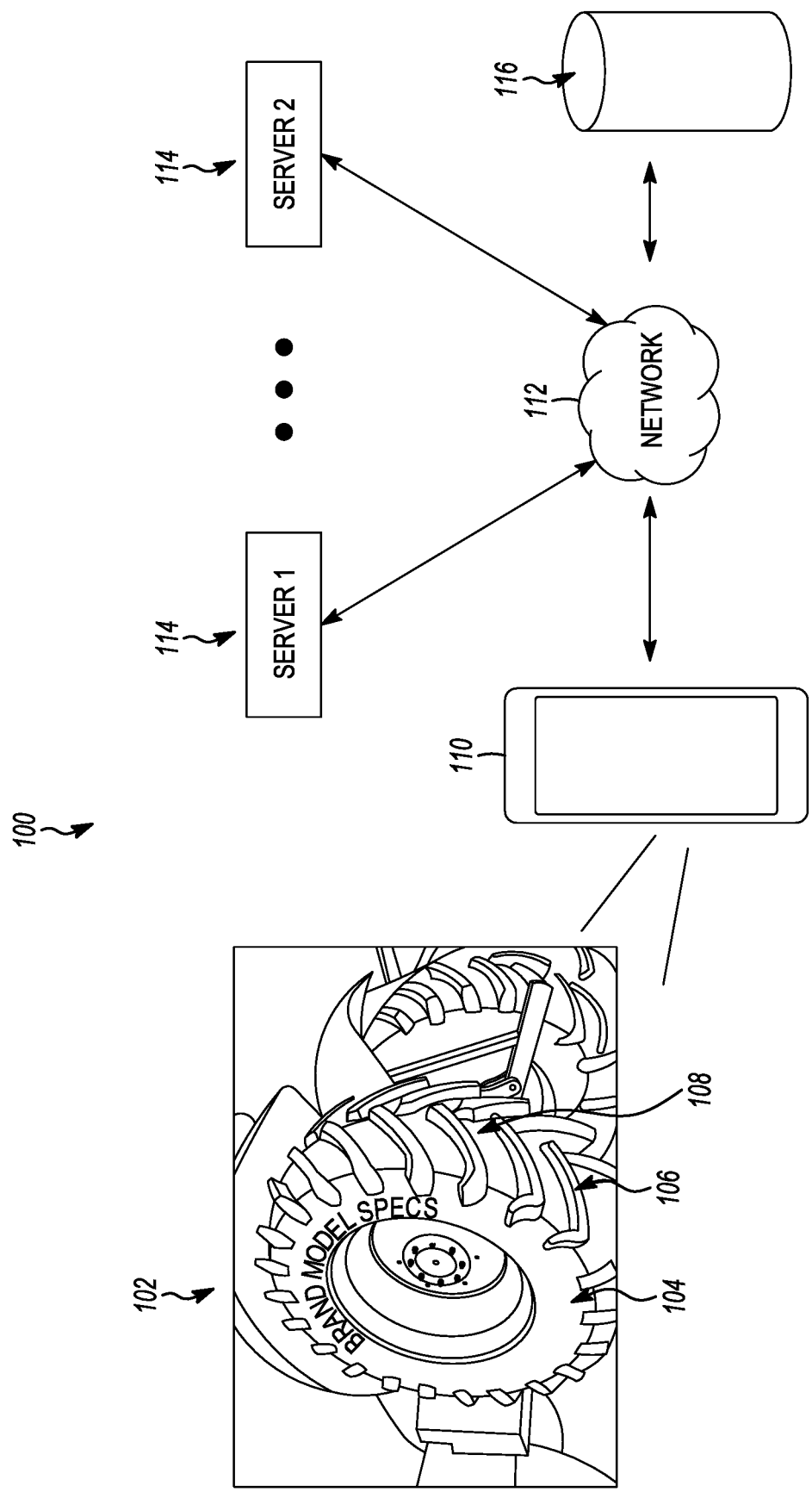
FIG. 1 generally illustrates a tire valuation environment according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, tires, such as those found on cars, trucks, sport utility vehicles, crossovers, mini-vans, marine crafts, aircrafts, all-terrain vehicles, recreational vehicles, agricultural vehicles and equipment, and the like, are typically provided in a variety of sizes having a variety of tread types (e.g., shapes and sizes) and tread depths. Over a period, tread of a tire is worn from use, environmental factors, and/or other suitable factors. Typically, when the tire tread is worn beyond a point of usefulness (e.g., or safety), the tire is replaced.

However, in certain scenarios, especially for tires related to agricultural vehicles and equipment (referred to herein after as agricultural machines), tires may be removed from one agricultural machine and installed on another agricultural machine. Agricultural machines may include tractors, all-terrain vehicles, backhoes, front-end loaders, cultivators, cultipackers, combines, forge harvesters, and the like.

Typically, a first agricultural machine may be used for a particular type of agricultural work in a particular environment. The first agricultural machine may require a first set of tires having a particular size, tread depth, and/or other features that allow the first agricultural machine to be used for the particular type of agricultural work in the particular environment. At some point during the lifecycle of the first agricultural machine, an owner of the first agricultural machine may sell the first agricultural machine, the first agricultural machine may be repossessed by a financing firm, a lease on the first agricultural machine may expire, or any other suitable situation that causes the first agricultural machine to pass to a different owner.

The new owner of the first agricultural machine may plan to use the first agricultural machine for a different particular type agricultural work and/or in a different particular environment. This typically requires the new owner to replace the tires of the first agricultural machine with tires more suited for the new type of agricultural work and/or new environment. Accordingly, the new owner may offer for sale, typically to a third party vendor, the first set of tires. The new owner or the third party vendor may then determine a value of the tire using the tire brand, the tire model, a tire size, an original tread depth, a current tread depth, and/or other suitable features of the first set of tires to determine a value. This typically involves the owner of the tires estimating the current tire tread depth and/or a representative of the third party vendor traveling to the location of the first set of tires to measure the current tread depth.

Such manual inspection of the current tire tread depth may result in inaccurate estimations of the current tire tread depth due to user error. Further, additional information, such as the tire brand, the tire model, the tire size, the original tire tread depth, and the like may not be available to the owner of the first set of tires.

Accordingly, systems and methods, such as those described herein, configured to improve tire valuation, may be desirable. In some embodiments, the systems and methods described herein may be configured to provide an interface configured to receive input from a user. For example, a user may interact with the interface on a computing device, such as a mobile computing device. The user may provide input data to one or more input fields of the interface. The systems and methods described herein may be configured to provide an application, such as an application executable on a computing device. The application may be configured to generate the interface and provide the interface on a screen of the computing device.

In some embodiments, the input data may include tread depth of the tire, along with other information including, for example, an image of the tire. The image of the tire may include the make of the tire and/or the tire tread to show wear patterns. In some embodiments, the systems and methods described herein may be configured to receive, at the interface, user contact information, such as address, email address, and phone number.

In some embodiments, the systems and methods described herein may be configured to receive an electronically measured tire tread depth. For example, the tire depth may be electronically measured and the model, size, as well as any other pertinent information is obtained digitally, or electronically. In some embodiments, the tire tread depth and/or other pertinent information may be obtained electrically using a mobile computing device, such as a smart phone or tablet. The mobile computing device may also be used to capture the model of the tire, size of the tire, and year of production by use of for example an image capturing device (e.g., such as a camera) of the mobile computing device. The information obtained using the image-capturing device may then be populated, automatically, to various corresponding fields on the interface.

In some embodiments, the systems and methods described herein may be configured to compare the inputted data with data stored in a database. The database may store data corresponding to relevant tires and corresponding values. The systems and methods described herein may be configured to select a value or a range of values and communicate, to the user via the interface or another suitable communication mechanism e.g., email and the like), the value or range of values. The value or range of values may include the trade-in value, offer price, market value, bid value, auction value, other suitable value, or a combination thereof (e.g., depending on a choice of the user as well as the site owner). For example, the systems and methods described herein may determine the value based on the user trading the tire in and purchasing another, in response to input by the user indicating that the user desires to trade in the tire.

In some embodiments, the systems and methods described herein may be configured to determine a bid value based on an amount bid by other users desiring to purchase the tire (e.g., users interested in the same model, brand, size, range of remaining tread depth, and the like). In some embodiments, the systems and methods described herein may be configured to determine a sale price based on a price a site owner is willing to pay, a market price, or some other variation thereof. In some embodiments, the systems and methods described herein may be configured to provide necessary information to complete the sale, such as a purchase button or information disposed on the interface.

In some embodiments, the systems and methods described herein may be configured to receive a first input that indicates at least one aspect of a tire. The systems and methods described herein may be configured to capture, using an image-capturing device, a first image of the tire. The systems and methods described herein may be configured to communicate, to a remotely located server, the first image of the tire. The server may be configured to analyze the first image and identify a brand of the tire, a model of the tire, a size of the tire, other suitable information pertaining to the tire, or a combination thereof. The server may be configured to analyze the first image using an artificial intelligence engine that uses at least one machine-learning model. The machine-learning model may be configured to generate one or more predictions indicating the brand of the tire, the model of the tire, the size of the tire, other information pertinent to the tire, or a combination thereof. In some embodiments, the server is configured to compare the first image to a plurality of images and identify information pertaining to the tire that matches one or more of the plurality of images. In some embodiments, the first image may include an image of a sidewall of the tire.

In some embodiments, the systems and methods described herein may be configured to receive, from the server, the brand of the tire, the model of the tire, the size of the tire, other suitable information pertaining to the tire, or a combination thereof. The systems and methods described herein may be configured to provide, at an interface, a first output indicating the brand of the tire, the model of the tire, the size of the tire, other suitable information pertaining to the tire, or a combination thereof. The systems and methods described herein may be configured to capture, using the image-capturing device and at least one sensor, a baseline measurement of a tread depth of the tire. The sensor may include a light detection and ranging (LiDAR) sensor, a sonar sensor, other suitable sensor, or a combination thereof.

In some embodiments, the systems and methods described herein may be configured to calculate, using the captured baseline measurement of the tread depth of the tire, an actual tread depth of the tire. The systems and methods described herein may be configured to provide, at the interface, a second output indicating at least the actual tread depth of the tire. The systems and methods described herein may be configured to calculate, using information stored in a database and based on the actual tread depth of the tire, the brand of the tire, the model of the tire, and the size of the tire, other information pertaining to the tire, or a combination thereof, a value of the tire.

FIG. 1 generally illustrates a tire valuation environment 100 according to the principles of the present disclosure. As is generally illustrated, a tire 102 may be associated with a vehicle, such as an agricultural machine. However, it should be understood that the tire 102 may be associated with any suitable vehicle or other mechanism configured to use tires corresponding to the tire 102. The tire 102 may include any suitable tire and may include any suitable features in addition or other than those described herein. Additionally, or alternatively, while only one tire 102 is illustrated and described, the principles of the present disclosure may be applied to any suitable number of tires. Further, as will be described, the systems and methods described herein may determine a value for the tire 102 and/or for a set of tires that includes the tire 102 (e.g., or any other suitable tire or set of tires).

The tire 102 may include a sidewall 104. The sidewall 104 may include various information, such as the brand of the tire 102, the model of the tire 102, the size of the tire 102, a minimum fill rate (e.g., indicated in pounds per square inch or other suitable indicator) of the tire 102, a maximum fill rate (e.g., indicated in pounds per square inch or other suitable indicator) of the tire 102, other suitable information pertaining to the tire 102, or a combination thereof.

The tire 102 may include treads 106 and a tread depth 108. The treads 106 may include any suitable shape, size, design, and the like. The tread depth 108 may include a value indicating a measurement a peak of a corresponding tread 106 to a valley adjacent to the corresponding tread 106. The treads 106 may wear during use of the tire 102. Accordingly, the tread depth 108 of the tire 102 may change as the tire 102 is used.

As described, an owner of the tire 102 may desire to sell the tire 102. The owner may interact with a computing device, such as the computing device 110. The computing device 110 may include any suitable computing device, such as a mobile computing device (e.g., smart phone, tablet, and the like), a laptop-computing device, a desktop computing device, and the like.

Figure 2:
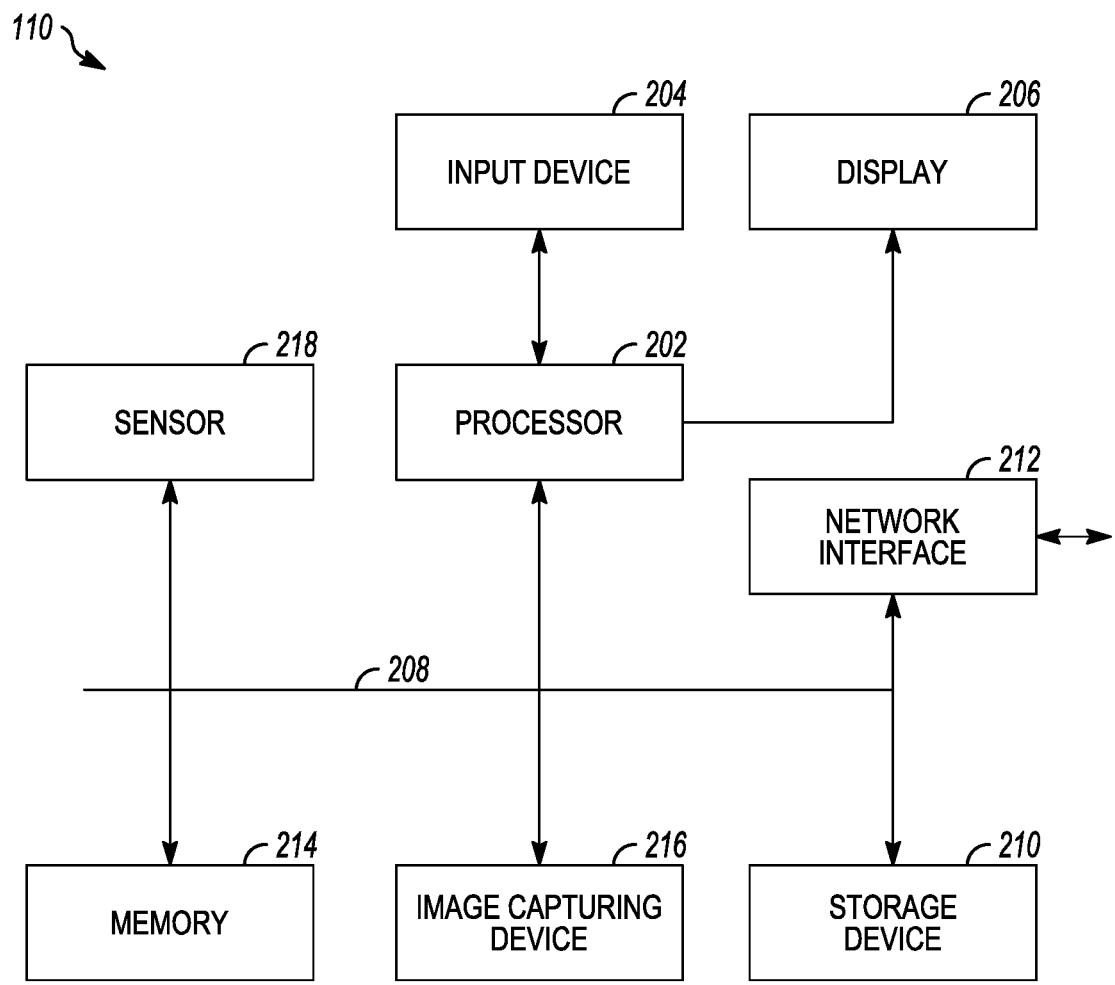
FIG. 2 generally illustrates a computing device according to the principles of the present disclosure.

As is generally illustrated in FIG. 2, the computing device 110 may include a processor 202 configured to control the overall operation of computing device 110. The processor 202 may include any suitable processor, such as those described herein. Additionally, or alternatively, the computing device 110 may include any suitable number of processors in addition to or other than the processor 202. The computing device 110 may also include a user input device 204 that is configured to receive input from a user of the computing device 110 and to communicate signals representing the input received from the user to the processor 202. For example, the user input device 204 may include a button, keypad, dial, touch screen, audio input interface, visual/image capture input interface, input in the form of sensor data, etc.

The computing device 110 may include a display 206 that may be controlled by the processor 202 to display information to the user. A data bus 208 may be configured to facilitate data transfer between, at least, a storage device 210 and the processor 202. The computing device 110 may also include a network interface 212 configured to couple or connect the computing device 110 to various other computing devices or network devices via a network connection, such as a wired or wireless connection. In some embodiments, the network interface 212 includes a wireless transceiver.

The storage device 210 may comprise a single disk or a plurality of disks (e.g., hard drives), one or more solid-state drives, one or more hybrid hard drives, and the like. The storage device 210 may include a storage management module that manages one or more partitions within the storage device 210. In some embodiments, storage device 210 may include flash memory, semiconductor (solid state) memory or the like. The computing device 110 may also include a memory 214. The memory 214 may include Random Access Memory (RAM), a Read-Only Memory (ROM), or a combination thereof. The memory 214 may store programs, utilities, or processes to be executed in by the processor 202. The memory 214 may provide volatile data storage, and stores instructions related to the operation of the computing device 110. For example, the memory 214 may include instructions that, when executed by the processor 202, cause the processor 202, at least, perform tire valuation, as described herein.

The computing device 110 may include an image-capturing device 216. The image capturing device 206 may include a camera or other suitable image capturing device. The image-capturing device 216 may be configured to capture one or more images and to communicate the one or more images to the processor 202 and/or store the one or more images in the storage device 210 and/or the memory 214.

The computing device 110 may include one or more sensors 218. The sensor 218 may include a LiDAR sensor, a sonar sensor, a gyroscopic sensor, a motion sensor, any other suitable sensor, or a combination thereof.

With continued reference to FIG. 1, the computing device 110 may communicate with one or more servers 114. The servers 114 may be included in a group of servers 114 and/or a distributed server system, such as a cloud computing system, datacenter, or other suitable server or server system. The one or more servers 14 may collectively be referred to as the server 14 herein. The server 114 may include any suitable computing device and may include features similar to or different from the computing device 110.

The computing device 110 may communicate with the server 114 via a network 112. The network 112 may communicatively (directly or indirectly) couple, for example, the computing device 110 with the server 114. The network 12 may be an interconnected network of devices that may include, or may be communicatively coupled to, the Internet and/or other suitable public or private network. The computing device 110 may communicate with the network via a wired or wireless connection, such as via an Ethernet connection, a WiFi connection, a near field communication connection, and/or other suitable connection.

In some embodiments, the computing device 110 may be configured to perform tire valuation of the tire 102 (e.g., and/or any other suitable tire or set of tires). The computing device 110 may receive a first input that indicates at least one aspect of the tire 102. The computing device 110 may be configured to execute an application that includes and/or is configured to generate an interface. The computing device 110 may provide the interface to a display, such as the display 206 or other suitable display, of the computing device 110. The interface may include one or more input fields configured to receive input from a user of the application on the computing device 110.

The computing device 110 may be configured to receive, via the one or more input fields of the interface, input that indicates at least one aspect of the tire 102 and/or at least one aspect of the user. For example, the input may indicate a geographical location of the tire 102, a brand of the tire 102, a model of the tire 102, a size of the tire 102, other information pertaining to the tire 102, or a combination thereof. As will be described, some or all of this information may be obtained automatically. Additionally, or alternatively, the input may include information pertaining to the user, such as a user name, an email address, a physical address, an account number, and the like.

In some embodiments, the computing device 110 may capture, using an image-capturing device, such as the image-capturing device 216, a first image of the tire 102. In some embodiments, the computing device 110 may receive an image of the tire 102. For example, the user may capture an image of the tire 102 using any suitable image-capturing device and may upload the image to the computing device 110. The computing device 10 may store the image of the tire 102 in the memory 214 and/or the storage device 210. The first image of the tire 102 may include a sidewall, such as the sidewall 104 of the tire 102.

The computing device 110 may be configured to determine pertinent information of the tire 102 based on the first image of the tire 102. The pertinent information may include a brand of the tire 102, a model of the tire 102, a size of the tire 102, an original tread depth of the tire 102, other suitable information pertaining the tire 102, or a combination thereof. In some embodiments, the computing device 110 may determine the pertinent information using the server 114 or other suitable server. For example, the computing device 110 may communicate, via the network 112, the first image of the tire 102 to the server 114. As described, the server 114 may be remotely located from the computing device 110.

In some embodiments, the server 114 may be configured to analyze the first image using any suitable image analysis technique. For example, the server 114 may use an artificial intelligence engine that uses one or more machine learning models to identified various aspects of the first image of the tire 102. The one or more machine learning models may be trained using various datasets that include images of a plurality of tire sidewalls. Once a machine learning model has been trained, the machine learning model may be configured to predict a brand of the tire 102, a model of the tire 102, a size of the tire 102, and/or any other suitable information disposed on the sidewall 104 of the tire 102 (e.g., and captured in the image of the tire 102). In some embodiments, the server 114 may be configured to identify the various information on the sidewall 104 of the tire 102 using any other suitable image processing technique than those described herein. For example, the server 1114 may be configured to compare the first image to a plurality of images and identify information pertaining to the tire that matches one or more of the plurality of images.

In some embodiments, the server 114 may be configured to access a database, such as the database 116. The database 116 may include any suitable database and may include pertinent information corresponding to the tire 102 and a plurality of other tires. For example, the database 116 may include original manufacturer information, such as the size of the tire 102, the original tread depth of the tire 102, warranty information of the tire 102, other pertinent information of the tire 102, or a combination thereof. The server 114 may access the database 116 and, using the various information identified on the sidewall 104 of the tire 102, identify additional pertinent information corresponding to the tire 102. The server 114 may communicate the pertinent information corresponding to the tire 102 to the computing device 110.

In some embodiments, the computing device 110 may be configured to use an artificial intelligence engine similar to that of the server 114. The computing device 110 may, using the artificial intelligence engine using a machine learning model, identify the pertinent information disposed on the sidewall 104 of the tire 102 (e.g., captured in the first image). The computing device 110 may access the database 116 and determine the further pertinent information of the tire 102, as described (e.g., the computing device 110 may be configured to perform the image analysis and determine the pertinent information of the tire 102 without using the server 114). In some embodiments, the server 114 may identify the pertinent information disposed on the sidewall 104, as described, and may communicate the information to the computing device 110. The computing device 110 may then access the database 116 to determine the further pertinent information of the tire 102. It should be understood that the any suitable database may be used in addition to or instead of the database 116 for storing, correlating, and retrieving any of the information described herein.

In some embodiments, the computing device 10 may provide, at the interface, a first output indicating the pertinent information of the tire 102 (e.g., the brand of the tire 102, the model of the tire 102, the size of the tire 102, a condition of the tire 102, other suitable information pertaining to the tire 102, or a combination thereof). The computing device 110 may capture, using the image-capturing device 216 and the sensor 218, a baseline measurement of a tread depth 108 of the tire 102.

The computing device 110 may calculate, using the captured baseline measurement of the tread depth 108 of the tire 102, an actual tread depth 108 of the tire 102. The computing device 110 may provide, at the interface, a second output indicating at least the actual tread depth 108 of the tire 102. The computing device 110 may calculate or determine, using the actual tread depth 108 and of the tire 102, the pertinent information of the tire 102, and information stored in the database 116 or other suitable database, a value of the tire. For example, the computing device 110 may access the database 116 and retrieve information corresponding to the tire 102 using one or more of the brand of the tire 102, the model of the tire 102, the size of the tire 102, a condition of the tire 102, and the like. The computing device 110 may identify a value or a range of values corresponding to the tire 102 and/or a similar tire having similar characteristics of the tire 102.

The computing device 110 may adjust the value or range of values based on the actual tread depth 108, the age of the tire 102, the environment corresponding to the operation or use of the tire 102, other suitable factors, or a combination thereof. In some embodiments, the value or the ranges of values corresponding to the tire 102 may be adjusted, based on the actual tread depth 108, the age of the tire 102, the environment corresponding to the operation or use of the tire 102, other suitable factors, or a combination thereof and stored in the database 116 (e.g., the computing device 110 may omit adjusting the value or range of values if the value or range of values already account for such factors in the database 116).

In some embodiments, the computing device 110 may generate an output indicating the value, the range of values, the pertinent information of the tire, one or more interested parties (e.g., interested in purchasing the tire 102), other suitable information, or a combination thereof. The computing device 110 may communicate the output to the user. For example, the computing device 110 may provide the output to the interface on the computing device 110, the computing device 110 may generate a message (e.g., such as an email message, a text message, an SMS message, and the like) and communicate the message to the user, and/or the computing device 110 may provide the output to the user in any other suitable manner. Additionally, or alternatively, the computing device 110 may provide the output to the third part associated with the application, one or more interested parties, or any other suitable party. In some embodiments, the computing device 110 may store the output in the storage device 210, on the database 116, or any other suitable location for later retrieval and/or for training one or more machine learning models.

In some embodiments, the computing device 110 and/or the server 114 may perform the methods described herein. However, the methods described herein as performed by the computing device 110 and/or the server 114 are not meant to be limiting, and any type of software executed on a controller or processor can perform the methods described herein without departing from the scope of this disclosure. For example, a controller, such as a processor executing software within a computing device, can perform the methods described herein.

Figure 3:
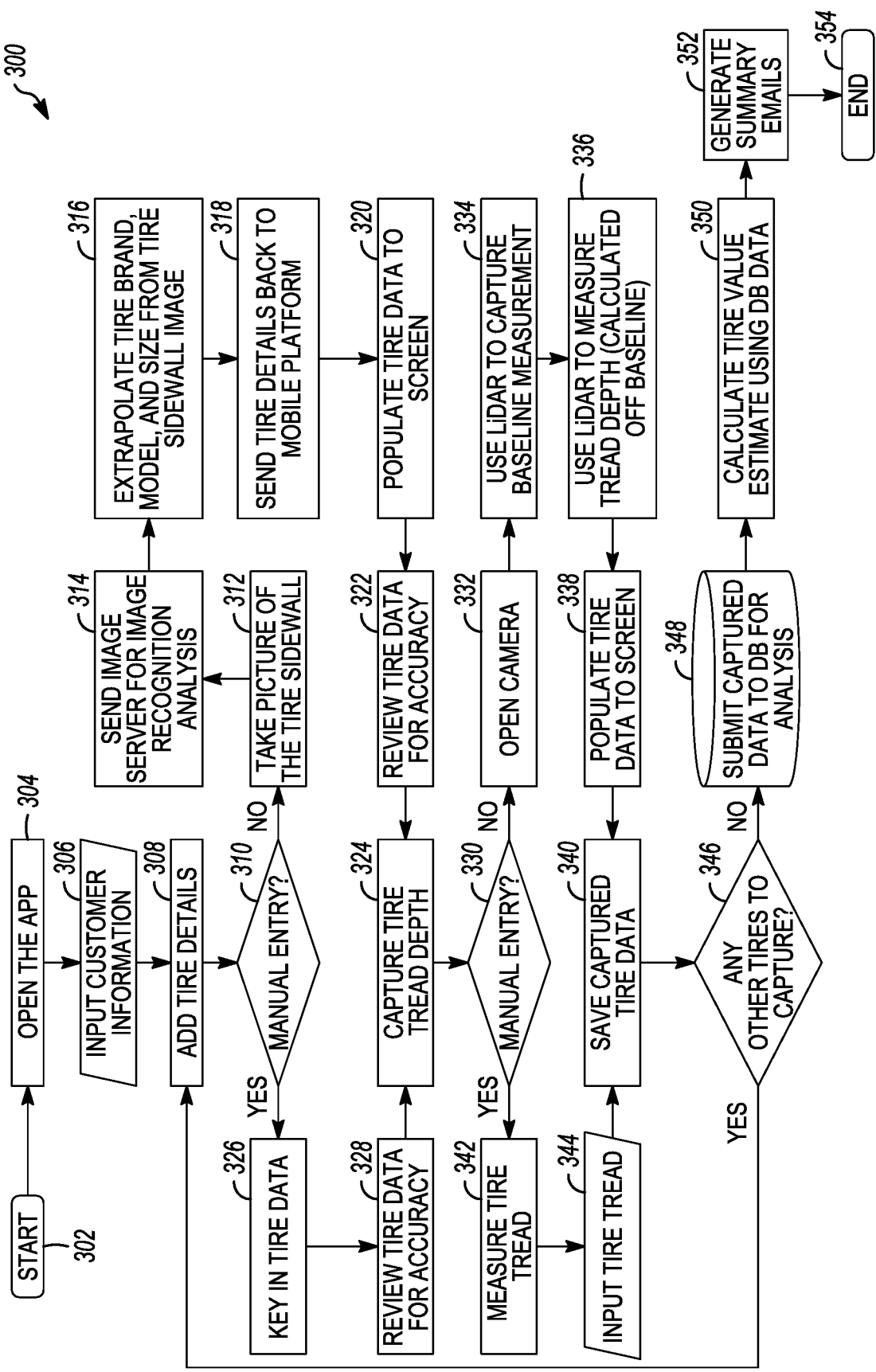
FIG. 3 is a flow diagram generally illustrating tire valuation method according to the principles of the present disclosure.

FIG. 3 is a flow diagram generally illustrating a tire valuation method 300 according to the principles of the present disclosure. At 302, the method 300 begins. At 304, the method 300 opens an application. For example, the user of the computing device 110 may open the application for performing tire valuation.

At 306, the method 300 provides customer information input. For example, the user of the computing device 110 may provide the input at the interface indicating, at least, one or more aspects of the user.

At 308, the method 300 adds tire details. For example, the user of the computing device 110 may provide input, at the interface, indicating, at least one aspect of the tire 102. The computing device 110 may update information provided at the interface to indicate the at least one aspect of the tire 102.

At 310, the method 300 determines whether information will be manually entered. For example, the computing device 110 may receive an indication from the user indicating that the user will enter information manually. If the computing device 110 determines that information will be entered manually, the method 300 continues at 326. Conversely, if the computing device 110 determines that the user will not enter information manually, the method 300 continues at 312.

At 312, the method 300 takes a picture of the tire sidewall. For example, the computing device 110, using the image-capturing device 216, captures the first image. The first image includes an image of the sidewall 104 of the tire 102.

At 314, the method sends the image to the server for image recognition analysis. For example, the computing device 110 communicates the first image to the server 114. The server 114 performs image analysis on the first image.

At 316, the method 300 extrapolates the tire brand, the tire model, the size of the tire, a condition of the tire, and/or other information using the sidewall image. For example, the server 114, using the artificial intelligence engine using the machine-learning model and/or any other suitable image processing or analysis technique, identified the pertinent information of the tire 102 using the sidewall 104.

At 318, the method 300 sends the tire details back to the mobile platform (e.g., the computing device 110). For example, the server 114 communicates the pertinent information of the tire 102 to the computing device 110.

At 320, the method 300 populates tire data to a screen. For example, the computing device 110 generates an output indicating the pertinent information of the tire 102. The computing device 110 provides the output at the interface on the display 206.

At 322, the method 300 reviews the tire data for accuracy. For example, the user of the computing device 110 may review the pertinent information of the tire 102 for accuracy. The user may indicate, using an input mechanism (e.g., an input field, a radio button, or other suitable input mechanism on the interface), that the pertinent information is accurate. If the user determines that the pertinent information of the tire 102 is not accurate, the user may revise the information. The computing device 110 may store the revised information.

At 324, the method 300 captures tire tread depth. For example, the computing device 110 may capture the tire tread depth 108 of the tire 102.

At 326, the method 300 keys in tire data. For example, the user may input, using various input fields on the interface, the pertinent information of the tire 102.

At 328, the method 300 reviews the tire data for accuracy. For example, the user of the computing device 110 may review the pertinent information of the tire 102 for accuracy. The user may indicate, using an input mechanism (e.g., an input field, a radio button, or other suitable input mechanism on the interface), that the pertinent information is accurate. If the user determines that the pertinent information of the tire 102 is not accurate, the user may revise the information. The computing device 110 may store the revised information.

At 330, the method 300 determines whether the tire tread depth will be provided manually. For example, the user may indicate, using an input mechanism, that the user will provide the tread depth 108 manually (e.g., by measuring the tread depth 108 and providing the tread depth 108 to an input field of the interface). If the computing device 110 determines that the tread depth 108 will be entered manually, the method 300 continues at 342. If the computing device 110 determines that the tread depth 108 will not be entered manually, the method 300 continues at 332.

At 332, the method 300 opens a camera. For example, the computing device 110 may activate the image-capturing device 216.

At 334, the method 300 uses LiDAR to capture a baseline measurement. For example, the computing device 110 may use the image-capturing device 216 and the sensor 218 to capture the baseline measurement of the tread depth 108. For example, the computing device 110 may use generate a laser-based image of the tire 102 using the image-capturing device 216 and the sensor 218. The computing device 110 and/or the server 114 may expand the image to frame an area of the image that includes the tread depth 108.

At 336, the method 300 uses the LiDAR measured baseline tread depth to calculate an actual tread depth. For example, the computing device 110, using the baseline measured tread depth 108, calculates an actual tread depth 108 of the tire 102. For example, the computing device 110 and/or the server 114 may use the frame of the laser-based image to identify the tread depth 108. The computing device 110 and/or the server 114 may identify low points and high points of the framed portion of the laser-based image to generate a calculated or determined tread depth 108. The tread depth 108 may be calculated or determined in millimeters or 32nds of an inch. In some embodiments, the user may interact with the display 206, such as by using a touch gesture, to direct the computing device 110 to various areas in the laser-based image to assist in identifying the low and high points of the image.

At 338, the method 300 populates tire data to the screen. For example, the computing device 110 generates an output indicating the baseline measured tread depth 108, the actual tread depth 108, other suitable information, or a combination thereof. The computing device 110 may provide the output at the interface using the display 206.

At 340, the method 300 saves captured tire data. For example, the computing device 110 stores the pertinent information of the tire 102, the baseline measured tread depth 108, the actual tread depth 108, other suitable information, or a combination thereof at the storage device 210, the database 116, any other suitable location, or a combination thereof.

At 342, the method 300 measures tire tread. For example, the user may manually measure the tire tread depth 108 of the tire 102.

At 344, the method 300 inputs the tire tread. For example, the user may use an input field on the interface to provide the measured tread depth 108.

At 346, the method 300 determines whether there are any other tires to capture. For example, the user may indicate, using an input mechanism on the interface, that one or more other tires require valuation. If the computing device 110 determines that one or more other tires require valuation, method 300 continues at 308. If the computing device 110 determines that no other tires require valuation, the method 300 continues at 348.

At 348, the method 300 submits captured data to database for analysis. For example, the computing device 110 may store the pertinent information, the baseline measured tread depth 108, the actual tread depth 108, other suitable information, or a combination thereof to the database 116 for later retrieval, further analysis, or training a machine-learning model, any other suitable use for the data, or a combination thereof.

At 350, the method 300 calculates a tire value estimate using database data. For example, the computing device 110 calculates or determines the value or range of values using the information stored in the database 116.

At 352, the method 300 generates summary emails. For example, the computing device 110 may generate one or more emails indicating, at least, the tire valuation of the tire 102. The computing device 110 may communicate the emails to the user, the third party, or other suitable parties.

At 354, the method 300 ends.

Figure 4:
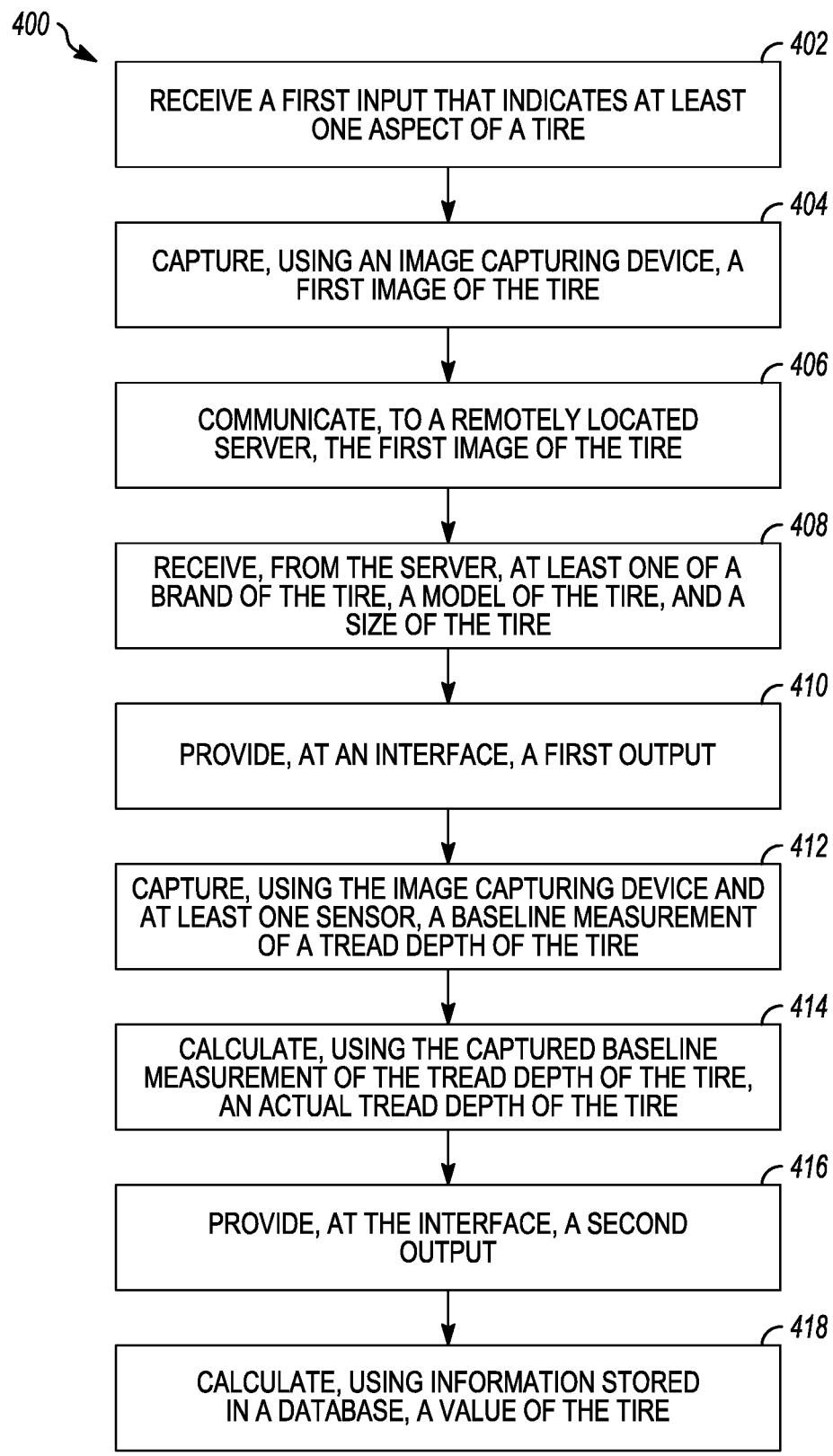
FIG. 4 is a flow diagram generally illustrating an alternative tire valuation method according to the principles of the present disclosure.

FIG. 4 is a flow diagram generally illustrating an alternative tire valuation method 400 according to the principles of the present disclosure. At 402, the method 400 receives a first input that indicates at least one aspect of a tire. For example, the computing device 110 receives the first input indicating at least one aspect of the tire 102.

At 404, the method 400 captures, using an image-capturing device, a first image of the tire. For example, the computing device 110, using the image-capturing device 216, captures a first image of the tire 102. The first image may include the sidewall 104 of the tire 102.

At 406, the method 400 communicates, to a remotely located server, the first image of the tire. For example, the computing device 110 communicates, to the server 114, the first image of the tire 102. As described, the server 114 may be configured to analyze the first image and identify, at least one of a brand of the tire, a model of the tire, a condition of the tire, a condition of the tire, and a size of the tire.

At 408, the method 400 receives, from the server, the at least one of the brand of the tire, the model of the tire, and the size of the tire. For example, the computing device 110 may receive the pertinent information of the tire 102.

At 410, the method 400 provides, at an interface, a first output. For example, the computing device 110 may provide, at the interface, a first output indicating the at least one of the brand of the tire 102, the model of the tire 102, a condition of the tire 102, and the size of the tire 102.

At 412, the method 400 captures, using the image-capturing device and at least one sensor, a baseline measurement of a tread depth of the tire. For example, the computing device 110 captures, using the image capturing device 216 and the sensor 218, the baseline measurement of the tread depth 108 of the tire 102.

At 414, the method 400 calculates, using the captured baseline measurement of the tread depth of the tire, an actual tread depth of the tire. For example, the computing device 110, using the baseline measurement of the tread depth 108, calculates or determines an actual tread depth 108 of the tire 102.

At 416, the method 400 provides, at the interface, a second output indicating at least the actual tread depth of the tire. For example, the computing device 110 generates a second output indicating, at least, the actual tread depth 108 of the tire 102. The computing device 110 provides, at the interface, the second output.

At 418, the method 400 calculates, using information stored in a database and based on the actual tread depth of the tire and the at least one of the brand of the tire, the model of the tire, and the size of the tire, a value of the tire. For example, the computing device 110 calculates or determines, using the information stored in the database 116, the baseline tread depth measurement, the actual tread depth 108, the pertinent information of the tire 102, and/or any other suitable information, the value or range of values corresponding to the tire 102.

In some embodiments, a tire valuation system includes a processor and a memory. The memory includes instructions that, when executed by the processor, cause the processor to: receive a first input that indicates at least one aspect of a tire; capture, using an image capturing device, a first image of the tire; communicate, to a remotely located server, the first image of the tire, wherein the server is configured to analyze the first image and identify, at least one of a brand of the tire, a model of the tire, and a size of the tire; receive, from the server, the at least one of the brand of the tire, the model of the tire, and the size of the tire; provide, at an interface, a first output indicating the at least one of the brand of the tire, the model of the tire, and the size of the tire; capture, using the image capturing device and at least one sensor, a baseline measurement of a tread depth of the tire; calculate, using the captured baseline measurement of the tread depth of the tire, an actual tread depth of the tire; provide, at the interface, a second output indicating at least the actual tread depth of the tire; and calculate, using information stored in a database and based on the actual tread depth of the tire and the at least one of the brand of the tire, the model of the tire, and the size of the tire, a value of the tire.

In some embodiments, the processor and memory are associated with a mobile computing device. In some embodiments, the database is remotely located from the processor and memory. In some embodiments, the at least one sensor includes a light detection and ranging sensor. In some embodiments, the at least one sensor includes a sonar sensor. In some embodiments, the server is configured to analyze the first image using an artificial intelligence engine that uses at least one machine-learning model. In some embodiments, the first image includes an image of a sidewall of the tire. In some embodiments, the interface is disposed on a mobile computing device and configured to receive input and provide output. In some embodiments, the server includes at least one cloud-computing device. In some embodiments, the database includes information correlating a tire values to tire brands, tire models, tire sizes, and tire tread depths.

In some embodiments, a tire valuation method includes receiving a first input that indicates at least one aspect of a tire and capturing, using an image-capturing device, a first image of the tire. The method also includes communicating, to a remotely located server, the first image of the tire, wherein the server is configured to analyze the first image and identify, at least one of a brand of the tire, a model of the tire, and a size of the tire. The method also includes receiving, from the server, the at least one of the brand of the tire, the model of the tire, and the size of the tire and providing, at an interface, a first output indicating the at least one of the brand of the tire, the model of the tire, and the size of the tire. The method also includes capturing, using the image capturing device and at least one sensor, a baseline measurement of a tread depth of the tire and calculating, using the captured baseline measurement of the tread depth of the tire, an actual tread depth of the tire. The method also includes providing, at the interface, a second output indicating at least the actual tread depth of the tire and calculating, using information stored in a database and based on the actual tread depth of the tire and the at least one of the brand of the tire, the model of the tire, and the size of the tire, a value of the tire.

In some embodiments, the at least one sensor includes a light detection and ranging sensor. In some embodiments, the at least one sensor includes a sonar sensor. In some embodiments, the server is configured to analyze the first image using an artificial intelligence engine that uses at least one machine-learning model. In some embodiments, the first image includes an image of a sidewall of the tire. In some embodiments, the interface is disposed on a mobile computing device and configured to receive input and provide output. In some embodiments, the server includes at least one cloud-computing device. In some embodiments, the database includes information correlating a tire values to tire brands, tire models, tire sizes, and tire tread depths.

In some embodiments, an apparatus for tire valuation includes a processor and a memory. The memory includes instructions that, when executed by the processor, cause the processor to: capture, using an image capturing device, a first image of the tire; communicate, to a remotely located server, the first image of the tire, wherein the server is configured to analyze the first image and identify, at least one of a brand of the tire, a model of the tire, and a size of the tire; receive, from the server, the at least one of the brand of the tire, the model of the tire, and the size of the tire; capture, using the image capturing device and at least one sensor, a baseline measurement of a tread depth of the tire; calculate, using the captured baseline measurement of the tread depth of the tire, an actual tread depth of the tire; calculate, using information stored in a database and based on the actual tread depth of the tire and the at least one of the brand of the tire, the model of the tire, and the size of the tire, a value of the tire; and provide a summary of the value of the tire.

In some embodiments, the at least one sensor includes a light detection and ranging sensor.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A tire valuation system comprising:
a processor; and
a memory including instructions that, when executed by the processor, cause the processor to:
receive a first input that indicates at least one aspect of a tire, wherein the tire is associated with an agricultural machine, and wherein the at least one aspect of the tire includes at least a geographic location of the tire;
capture, using an image-capturing device, a first image of the tire;
communicate, to a remotely located server, the first image of the tire, wherein the server is configured to analyze the first image and identify, at least one of a brand of the tire, a model of the tire, and a size of the tire;
receive, from the server, the at least one of the brand of the tire, the model of the tire, and the size of the tire;
provide, at an interface, a first output indicating the at least one of the brand of the tire, the model of the tire, and the size of the tire;
capture, using the image-capturing device and at least one sensor, a baseline measurement of a tread depth of the tire;
calculate, using the captured baseline measurement of the tread depth of the tire, an actual tread depth of the tire;
provide, at the interface, a second output indicating at least the actual tread depth of the tire;
calculate, using information stored in a database and based on the actual tread depth of the tire and the at least one of the brand of the tire, the model of the tire, and the size of the tire, a value of the tire, wherein the value of the tire includes at least one of a trade-in value, an offer value, a market value, a bid value, and an auction value; and
adjust the value of the tire based on an environment corresponding to an historical operation of the tire and an historical agricultural work associated with the tire, wherein the one or more treads of the tire are affected by the historical agricultural work.

2. The system of claim 1, wherein the processor and memory are associated with a mobile computing device.

3. The system of claim 1, wherein the database is remotely located from the processor and memory.

4. The system of claim 1, wherein the at least one sensor includes a light detection and ranging sensor.

5. The system of claim 1, wherein the at least one sensor includes a sonar sensor.

6. The system of claim 1, wherein the server is configured to analyze the first image using an artificial intelligence engine that uses at least one machine learning model.

7. The system of claim 1, wherein the first image includes an image of a sidewall of the tire.

8. The system of claim 1, wherein the interface is disposed on a mobile computing device and configured to receive input and provide output.

9. The system of claim 1, wherein the server includes at least one cloud computing device.

10. The system of claim 1, wherein the database includes information correlating tire values to tire brands, tire models, tire sizes, and tire tread depths.

11. A tire valuation method comprising:
receiving a first input that indicates at least one aspect of a tire, wherein the tire is associated with an agricultural machine, and wherein the at least one aspect of the tire includes at least a geographic location of the tire;
capturing, using an image-capturing device, a first image of the tire;
communicating, to a remotely located server, the first image of the tire, wherein the server is configured to analyze the first image and identify, at least one of a brand of the tire, a model of the tire, and a size of the tire;

receiving, from the server, the at least one of the brand of the tire, the model of the tire, and the size of the tire;

providing, at an interface, a first output indicating the at least one of the brand of the tire, the model of the tire, and the size of the tire;

capturing, using the image-capturing device and at least one sensor, a baseline measurement of a tread depth of the tire;

calculating, using the captured baseline measurement of the tread depth of the tire, an actual tread depth of the tire;

providing, at the interface, a second output indicating at least the actual tread depth of the tire;

calculating, using information stored in a database and based on the actual tread depth of the tire and the at least one of the brand of the tire, the model of the tire, and the size of the tire, a value of the tire, wherein the value of the tire includes at least one of a trade-in value, an offer value, a market value, a bid value, and an auction value; and adjusting the value of the tire based on an environment corresponding to an historical operation of the tire and an historical agricultural work associated with the tire, wherein one or more treads of the tire are affected by the historical agricultural work.

12. The method of claim 11, wherein the at least one sensor includes a light detection and ranging sensor.

13. The method of claim 11, wherein the at least one sensor includes a sonar sensor.

14. The method of claim 11, wherein the server is configured to analyze the first image using an artificial intelligence engine that uses at least one machine learning model.

15. The method of claim 11, wherein the first image includes an image of a sidewall of the tire.

16. The method of claim 11, wherein the interface is disposed on a mobile computing device and configured to receive input and provide output.

17. The method of claim 11, wherein the server includes at least one cloud computing device.

18. The method of claim 11, wherein the database includes information correlating tire values to tire brands, tire models, tire sizes, and tire tread depths.

19. An apparatus for tire valuation comprising:

a processor; and a memory including instructions that, when executed by the processor, cause the processor to:

capture, using an image-capturing device, a first image of the tire, wherein the tire is associated with an agricultural machine;

communicate, to a remotely located server, the first image of the tire, wherein the server is configured to analyze the first image and identify, at least one of a brand of the tire, a model of the tire, and a size of the tire;

receive, from the server, the at least one of the brand of the tire, the model of the tire, and the size of the tire;

capture, using the image-capturing device and at least one sensor, a baseline measurement of a tread depth of the tire;

calculate, using the captured baseline measurement of the tread depth of the tire, an actual tread depth of the tire;

calculate, using information stored in a database and based on the actual tread depth of the tire and the at least one of the brand of the tire, the model of the tire, and the size of the tire, a value of the tire;

adjust the value of the tire based on an environment corresponding to the operation of an historical operation of the tire and an historical agricultural work associated with the tire, wherein at least one tread of the tire is affected by the historical agricultural work; and provide a summary of the value of the tire, wherein the value of the tire includes at least one of a trade-in value, an offer value, a market value, a bid value, and an auction value.

20. The apparatus of claim 19, wherein the at least one sensor includes a light detection and ranging sensor.

* * * * *